Patented Oct. 28, 1952

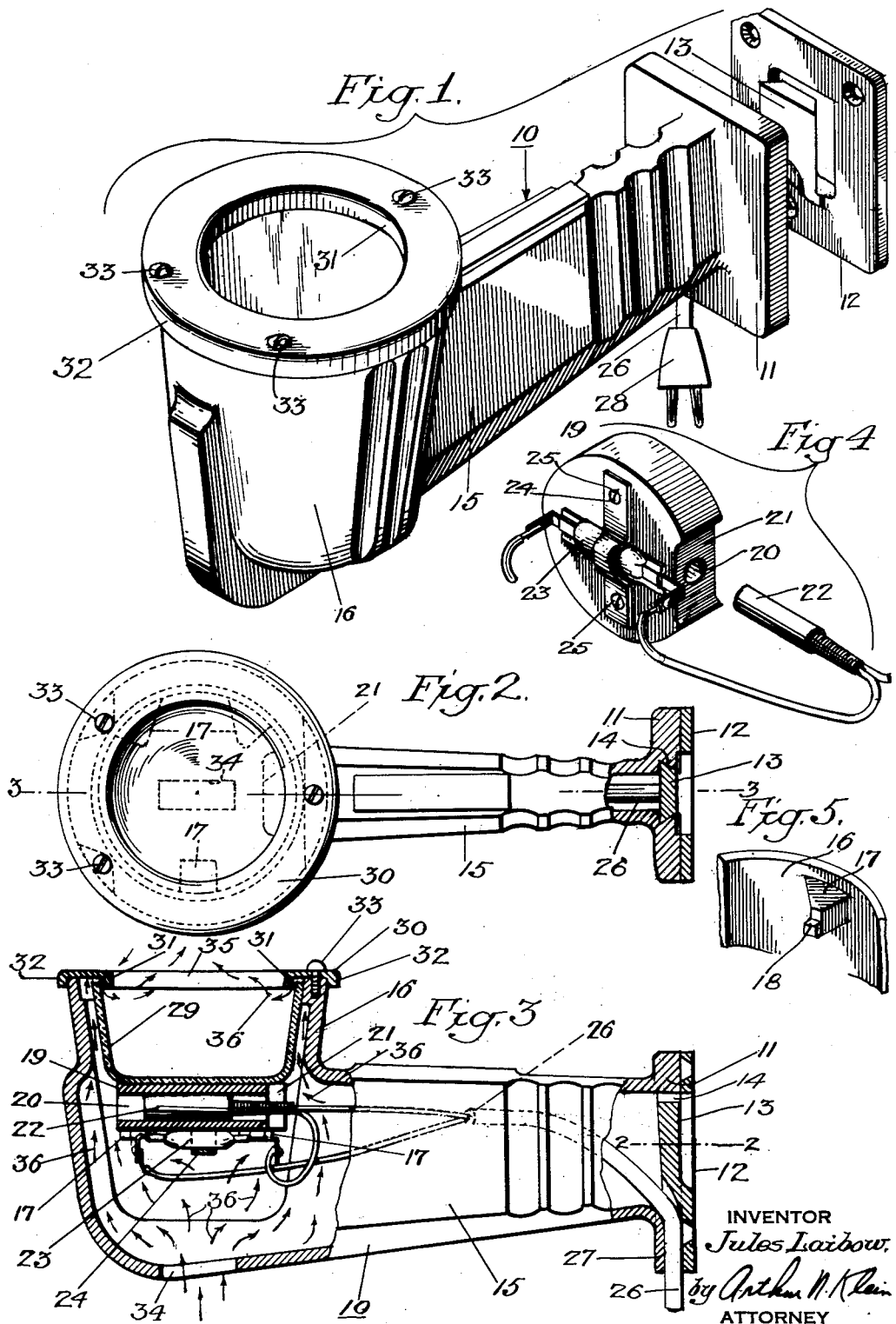

2,616,024

UNITED STATES PATENT OFFICE 2,616,024

VAPORIZER FOR INSECTICIDES AND THE LIKE

Jules Laibow, Merchantville, N. J., assignor to Cardinal Chemical Corporation, Philadelphia, Pa., a corporation of Pennsylvania Application June 20, 1951, Serial No. 232,539

4 Claims. (Cl. 219—44)

The present invention relates generally to vaporizers for insecticides and the like and it relates more particularly to insecticide-vaporizers wherein a hermostatically-controlled electrical heating element maintains the temperature within a given range calculated to cause vaporization of the insecticide at a predetermined rate.

An object of the present invention is to provide a new and improved vaporizer for insecticides and the like. Another object of the present invention is to provide a novel insecticide-vaporizer which is simple and easy to manufacture, relatively inexpensive and yet accurate and dependable in operation, durable and at the same time so constructed that those parts which are capable of failure through accident or long use can be readily replaced.

Other objects and advantages of the present invention are apparent in the following detailed description, appended claims and accompanying drawings.

It has been known for many years that rooms can be kept free of flies, mosquitoes and other insects, without harmful effects upon humans or domestic animals, by spraying or vaporizing therein such insecticides as DDT and lindane (which is the gamma isomer of hexachlorocyclohexane). It has also long been known that a particularly effective way to vaporize these insecticides is to heat them at relatively moderate temperatures so as to cause the materials (which are substantially non-volatile solids at room temperature) to vaporize gradually in the form of an aerosol and to give a sufficiently high concentration in the air to be lethal to insects while being harmless to humans and animals and without contamination of foods being stored or prepared in the room. While many different types of insecticide-vaporizers have been suggested in the past, none of them has proven entirely satisfactory or acceptable.

Accordingly, the present invention contemplates a new and improved electric vaporizer designed particularly for the relatively slow, controlled vaporization of insecticides which is simple and yet dependable in operation, and which is so constructed and arranged that the heating unit, thermostatic control and insecticide container can each be readily replaced if it becomes defective due to prolonged use or accident.

Generally speaking, the novel vaporizer of the present invention includes a frame or housing having an open-top bowl, containing a removable generally disc-shaped hot-plate which is diametrically apertured to receive a removable cartridge-type heating element and which has a self-contained thermostat element fastened to its underside, and a cup for insecticide positioned within the bowl and seated upon the hot-plate; the bowl being provided with a peripheral collar or lid which normally holds the cup securely in place but which can be detached to permit removal of the cup.

For the purpose of illustrating the invention, an embodiment which is presently preferred is shown and described herein, it being understood, however, that the invention is not limited to the precise arrangements and instrumentalities disclosed.

Referring to the accompanying drawings, in which like reference characters indicate like parts throughout:

Figure 1 is a perspective view of a vaporizer forming one embodiment of the present invention.

Figure 2 is a top plan view of the embodiment of Fig. 1.

Figure 3 is another view, partly in side elevation and partly in vertical cross-section of the embodiment of Fig. 1.

Figure 4 is an exploded perspective view of the hot-plate and heating-element.

Figure 5 is a fragmentary perspective view of the inside of the bowl showing a detail of the hot-plate supporting structure.

According to the embodiment of Figs. 1–5, the novel vaporizer of the present invention may include a more or less integrally formed housing of metal or the like, which is indicated generally by the reference character 10. The housing 10 contains various features of ornamentation which are the subject of my co-pending application, Serial No. D. 15,613, filed simultaneously herewith, now Design Letters Patent D. 164,242, granted Aug. 14, 1951.

The housing 10 includes a generally flat end-plate 11, which is adapted to be fastened to a wall or other vertical supporting surface in any suitable manner, as for example by means of a wall-plate 12 having an upwardly directed and tapered tongue 13 of trapezoidal cross-section, which is adapted to make detachable engagement with a correspondingly shaped undercut groove 14 in the end-plate 11. The housing 10 also includes a hollow arm 15 which extends generally horizontally from the end-plate 11 and a hollow, open-top, downwardly tapered bowl 16, formed at the outer end of, and in communication with, the arm 15. An opening 34 is provided in the housing 10, at the bottom of the bowl 16, to permit convection-flow of air through the bowl as will be described more fully hereinbelow.

Integrally formed on the inside of the bowl 16 are a plurality (for example three) of circumferentially distributed, inwardly extending lugs 17 which are shown in dotted-lines in Fig. 2, and one of which is shown in Fig. 5. The lugs 17 are kerfed or notched at their inner free ends to provide centering supporting shoulders 18 for a separate removable generally disc-shaped hot-plate 19. As shown more particularly in Figs. 3 and 4, the hot-plate 19 is provided with a central opening 20 extending diametrically therethrough, and a generally segment-shaped notch 21 intersecting one end of the opening 20. The hot-plate 19 is adapted to be positioned upon the shoulders 18 of the lugs 17, with the notch 21 adjacent the arm 15, as shown in Fig. 3.

A generally cylindrical cartridge-like heating-element 22 is constructed and arranged removably to be inserted within the opening 20 as indicated in Figs. 3 and 4. The heating-element 22 is of conventional construction containing electrical resistance wiring (not shown) and is connected in series with a conventional make-and-break thermostat-unit 23 which is fastened to the underside of the hot-plate 19 by a metal strap 24 and screws 25. To the heating-element 22 and thermostat-unit 23 are connected the wires of an electric-cord 26 which extends through the hollow arm 15 and emerges through a slot 27 formed in the bottom of the end-plate 11; the free end of the electric-cord carrying a conventional plug 28 for detachable connection to any electric socket (not shown) so as to energize the heating-element 22.

The thermotat-unit 23 is of the pre-set type adapted to maintain the hot-plate 19 at a predetermined temperature (plus or minus a few degrees) by breaking the circuit to the heating-element 22 when the hot-plate temperature exceeds the predetermined value and by re-closing the circuit when the hot-plate temperature falls below the predetermined value.

Seated upon the hot-plate 19 is a cup or dish 29 intended to hold the insecticide or fumigant or the like to be volatilized. The cup 29 may be of heat-proof glass or other suitable chemically-resistant and heat-resistant material and is somewhat smaller in maximum diameter than the inside of the bowl 16 so as to provide an annular cleance therebetween.

A peripheral lid or collar 30, having inner and outer downturned annular flanges 31 and 32, is fastened to the top of the bowl 16 by screws 33, so as to overlie the rims of the bowl and the cup 29, as indicated in Fig. 3. However, a slight clearance is provided between the lid 30 and the rim of the cup 29, as also indicated in Fig. 3.

With the vaporizer plugged in and operating, air from the room enters the bowl 16 through an inlet-opening 34 formed in the bottom thereof and rises, through convection, to pass through the clearances intermediate the cup 29 and the bowl 16 and lid 39, to sweep across the surface of the material being volatilized in the cup, and finally to emerge through the central opening 35 of the lid 30, as indicated by the arrows 36 in Fig. 3.

This not only prevents overheating of the heating-unit 22 and hot-plate 19, but also facilitates volatilization of the heated insecticide, in a manner well known to those skilled in the art, and thereby enables the vaporizer to operate at a somewhat lower temperature setting than would otherwise be required to give the desired rate of volatilization. This, of course, cuts down the electricity consumed and results in greater economy of operation.

It is readily apparent that the insecticide or the like to be volatilized can be charged into the cup 29 through the opening 35, from time to time to replace that which is volatilized.

When it becomes necessary to clean or replace the cup 29, the screws 33 and lid 30 are removed and the cup simply lifted out.

Should it become necessary to replace the heating-element 22 or thermostat-unit 23, the lid 30 and cup 29 are removed as described above, whereupon the hot-plate 19 is pulled out of the top of the bowl. As indicated in Fig. 4, the heating-element and the thermostat-unit 23 are thus exposed for ready disconnection and replacement, by merely cutting and re-connecting the wires (and, in the case of the thermostat-unit, by removing and then replacing the strap 24 and screws 25).

The housing may be formed inexpensively from light-weight aluminum alloy or from steel or the like in any suitable manner, as for example by die-casting left and right longitudinal half-sections and welding them together into an integral unit.

The heating-element 22 is a self-contained unit, the wiring of which is fully shielded and requires no exterior electrical insulation intermediate the heating-element and the hot-plate, such as is ordinarily required to prevent short-circuiting. Similarly, the thermostat-unit is self-contained and electrically shielded and requires insulation only at the soldered connections of the wires to its terminal-posts.

The present invention may be embodied in other specific forms and, accordingly, the above-described embodiment is to be considered merely as illustrative and not restrictive, reference being made to the appended claims, rather than to the foregoing description, as indicating the scope of the invention.

Having thus described my invention, I claim as new and desire to protect by Letters Patent:

1. In a vaporizer for insecticides and the like, a generally horizontal housing having a generally upright open-top bowl formed at its end, a generally disc-shaped hot-plate horizontally positioned within said bowl and removable therefrom, said hot-plate being disposed at a level substantially below the top of the bowl but substantially above the bottom thereof, said hot-plate having a radial opening formed therein, a self-contained generally cylindrical cartridge-type electrical heating element removably positioned within said radial opening, a self-contained thermostat-unit connected to the underside of the hot-plate and removable from the bowl therewith, said thermostat-unit being operatively connected to the heating-element so as to make and break the electrical circuit thereto and thereby to maintain the hot-plate within a predetermined temperature range, and a cup for insecticide or the like removably disposed within the upper portion of the bowl above the hot-plate, the cup being spaced away from the inner wall of the bowl to provide an annular clearance therebetween, the bowl having a bottom opening formed therein, whereby air can enter the bowl and pass upward through the bowl by convection across the hot-plate and through said annular clearance, to emerge from the open-top of the bowl.

2. A construction according to claim 1 wherein the top of the bowl is provided with a detachable peripheral lid extending inward beyond the rim of the cup and having a downwardly-directed inner annular flange and a central opening, whereby the convection flow of warm air is deflected radially inward and across the surface of the insecticide in the cup before emerging from the central opening of the lid.

3. In a vaporizer for insecticides, a housing having a generally horizontally extending arm adapted to be secured at one end to a wall or the like and a generally upright downwardly tapered open-top bowl formed at the other end of the arm, a heating member removably mounted within the upper portion of said bowl, said heating member including a generally horizontal hotplate disposed somewhat below the top of the bowl and a self-contained heating element disposed within the hot-plate, a cup for insecticide resting upon and supported by said heating member with the bottom of the cup disposed above the hotplate and adapted to be heated thereby and with the rim of the cup disposed slightly below the top of the bowl, the cup being removable from the bowl independently of the heating member, and a self-contained thermostat mounted on the underside of the heating member and removable from the bowl therewith, said thermostat being operatively connected to the heating element so as to regulate the operation thereof and thereby to maintain the contents of the cup within a predetermined temperature range.

4. A construction according to claim 3 wherein annular clearances are provided intermediate the heating element and cup and the bowl, and wherein the bowl is provided with a bottom opening, whereby air can enter the bottom of the bowl and pass upward therethrough by convection to emerge from the open-top of the bowl generally peripherally of the cup.

JULES LAIBOW.

REFERENCES CITED

The following references are of record in the file of this patent:

UNITED STATES PATENTS

| Number | Name | Date |
| --- | --- | --- |
| 912,471 | Holly et al. | Feb. 16, 1909 |
| 1,547,160 | Bailey | July 28, 1925 |
| 1,982,358 | Smith | Nov. 27, 1934 |
| 2,230,265 | Robinson | Feb. 4, 1941 |
| 2,392,372 | Fisher | Jan. 8, 1946 |
| 2,540,095 | Buehler | Feb. 6, 1951 |
| 2,541,637 | Christopher et al. | Feb. 13, 1951 |
| 2,576,110 | Fisher | Nov. 27, 1951 |

FOREIGN PATENTS

| Number | Country | Date |
| --- | --- | --- |
| 415,895 | Great Britain | Sept. 6, 1934 |

OTHER REFERENCES

Chromalox, Catalog 50, reprint March 1950, Edwin L. Wiegand Co., 7500 Thomas Blvd., Pittsburgh 8, Pennsylvania, page 10, relied upon.